United States Patent
Darr

(12) 
(10) Patent No.: US 6,296,803 B1
(45) Date of Patent: Oct. 2, 2001

(54) METHOD FOR MAKING A MULTI-LAYER BLOW MOLDED CONTAINER

(75) Inventor: Richard C. Darr, Seville, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 682 days.

(21) Appl. No.: 08/575,347

(22) Filed: Dec. 20, 1995

(51) Int. Cl.⁷ .................................................. B29C 49/06
(52) U.S. Cl. .................... 264/513; 264/547; 264/554; 425/388
(58) Field of Search ..................... 264/513, 547, 264/554; 425/388; 428/36.91

(56) References Cited

U.S. PATENT DOCUMENTS

| | | | |
|---|---|---|---|
| 2,365,637 | * 12/1944 | Helwig | 264/554 |
| 3,717,544 | 2/1973 | Valyl . | |
| 3,719,735 | 3/1973 | Valyi . | |
| 3,726,953 | * 4/1973 | Jones et al. | 264/554 |
| 3,954,923 | * 5/1976 | Valyi | 264/513 |
| 3,955,697 | * 5/1976 | Valyi | 264/513 |
| 4,034,054 | * 7/1977 | Sauer | 264/322 |
| 4,067,944 | 1/1978 | Valyi . | |
| 4,092,391 | 5/1978 | Valyi . | |
| 4,149,645 | 4/1979 | Valyi . | |
| 4,224,275 | * 9/1980 | Sauer | 264/516 |
| 4,391,861 | 7/1983 | Nilsson . | |
| 4,528,219 | * 7/1985 | Yamada et al. | 428/35 |
| 4,800,129 | * 1/1989 | Deak | 428/474.4 |
| 4,818,465 | * 4/1989 | Mente | 264/554 |
| 5,443,766 | * 8/1995 | Slat et al. | 264/513 |
| 5,599,589 | * 2/1997 | Valyi | 428/35.7 |

FOREIGN PATENT DOCUMENTS 0 672 721 A2  3/1994  (EP) .

* cited by examiner

Primary Examiner—Jan H. Silbaugh
Assistant Examiner—Mark Eashoo
(74) Attorney, Agent, or Firm—Brooks & Kushman P.C.

(57) ABSTRACT

A method for making a multi-layer blow molded container (10), the multi-layer preform (10') from which the container is blow molded, and the apparatus (53) for making a liner (24) of the preform utilizes thermoforming of a heated sheet (34) of resin. A vacuum is drawn within a vacuum enclosure (54) that is heated between a pair of spaced heaters (52). A first surface of the heated sheet of resin (34) and a male vacuum mold (56) engages the other surface of the heated sheet of resin which has a concave shape to provide the forming in a manner that prevents crystallinity of the lower freestanding base of the multi-layer container that is ultimately blow molded from the preform (10') made with the thermoformed liner (24).

8 Claims, 4 Drawing Sheets

METHOD FOR MAKING A MULTI-LAYER BLOW MOLDED CONTAINER

TECHNICAL FIELD

This invention relates to a method and apparatus for making a multi-layer blow molded container and also relates to a multi-layer blow molding preform as well as to the resultant multi-layer blow molded container that is blow molded from the multi-layer preform.

BACKGROUND ART

Prior blow molded containers have been made from multi-layer preforms so as to have the capability of using different materials that have desired properties for the particular use of the container. For example, U.S. Pat. No. 4,391,861 Nilsson discloses a multi-layer preform for use in blow molding and having inner and outer "part-preforms" that are disclosed as being made by injection molding or extrusion, and this patent also discloses the use of reprocessed plastic for one of the part-preforms.

U.S. Pat. No. 3,717,544 Valyi, U.S. Pat. No. 3,719,735 Valyi and U.S. Pat. No. 4,067,944 Valyi disclose multi-layer blow molded containers made from preforms having an inner layer provided by a liner about which an outer layer is formed by injection molding. The U.S. Pat. No. 3,717,544 Valyi patent discloses the liners as being made by a thermoforming process wherein a vacuum is applied to a female mold to deform a heated plastic sheet to the shape of the mold.

DISCLOSURE OF INVENTION

One object of the present invention is to provide an improved method for making a multi-layer blow molded container.

In carrying out the above object, the method for making a multi-layer blow molded container in accordance with the invention is performed by moving a sheet of resin having oppositely facing first and second surfaces between a pair a vacuum is drawn at a confined area at the first surface of the heated sheet of resin such that the first surface has a convex shape and the second surface has a concave shape. Thermoforming is performed to the heated sheet of resin by engagement at the concave second surface thereof with a male vacuum mold through which a vacuum is drawn to form the sheet of resin into a preform liner. Injection molding of an outer layer of resin around the preform liner provides a multi-layer preform. Blow molding of the multi-layer preform provides the multi-layer blow molded container.

In the preferred practice of the method, the vacuum is drawn at the first surface of the heated sheet of resin before the male vacuum mold engages the second surface of the heated sheet of resin. This vacuum is maintained at the first surface of the heated sheet of resin after the initial engagement of the male vacuum mold with the second surface thereof and while the male vacuum mold is thereafter moved to form the heated sheet of resin. This movement of the male vacuum mold is terminated and the vacuum drawn at the first surface of the heated sheet of resin is terminated whereupon the vacuum is then drawn through the male vacuum mold to complete the forming of the preform liner to the shape of the male vacuum mold. After the thermoforming of the heated sheet of resin by the male vacuum mold, the preform liner is trimmed from the rest of the sheet of resin prior to injection molding of the outer layer of resin to provide the multi-layer preform.

The injection molding of the outer layer of resin is performed with sufficient resin such that the outer layer by weight constitutes at least 75% of the total weight of the preform. The thermoforming may be performed on a virgin sheet of resin and the injection molding performed with post consumer recycled resin. The thermoforming may also be performed on a sheet of resin that is a barrier material. In addition, the thermoforming may be performed on a sheet of resin that includes more than one layer to provide a multi-layer liner around which the outer layer of resin is injection molded.

Another object of the present invention is to provide improved apparatus for making a preform liner for use in blow molding.

In carrying out the immediately preceding object, apparatus for making a preform liner for use in blow molding is disclosed as including a vacuum enclosure for drawing a vacuum within a confined area at a first surface of a heated sheet of resin which has a second surface that faces in the opposite direction as the first surface such that the first surface assumes a convex shape and the second surface assumes a concave shape. A male vacuum mold of the apparatus provides thermoforming of the heated sheet of resin by engagement therewith at the second surface thereof and has passages through which a vacuum is drawn to form the sheet of resin to the shape thereof to provide the preform liner.

In the preferred construction, the apparatus includes an actuator for moving the vacuum enclosure into and out of the sealed engagement with the heated sheet of resin. The preferred construction of the apparatus also includes an actuator for moving the male vacuum mold into engagement with the heated sheet of resin.

Another object of the present invention is to provide an improved multi-layer blow molding preform.

In carrying out the immediately preceding object, the multi-layer blow molding preform of the invention includes a liner that is thermoformed by applying a vacuum to one surface of a heated sheet of resin to provide a dome shape thereto and by engaging the other surface thereof with a male mold through which a vacuum is drawn to form the final shape of the liner. An injection molded outer layer of the preform extends around the liner and constitutes at least 75% by weight of the total preform weight. This outer layer has a closed end that has reduced crystallinity by virtue of the manner in which the liner is formed by the vacuum applied to the one surface of the heated sheet of resin and engagement of the other surface by the male vacuum mold.

The multi-layer blow molding preform of the invention can be manufactured with the liner as a virgin resin and the outer layer as post consumer recycled resin. The liner can be a barrier material that limits transmission of gas and other fluids and can also include more than one layer.

Another object of the present invention is to provide an improved multi-layer plastic blow molded container.

In carrying out the above object, the multi-layer plastic blow molded container of the invention includes an inner layer blow molded from a liner that is thermoformed by applying a vacuum to one surface of a heated sheet of resin to provide a dome shape thereto and by engaging the other surface thereof with a male vacuum mold through which a vacuum is drawn to form the final liner shape. An other layer of the container is blow molded from an injection molded outer layer around the liner. The container includes a body portion and an upper dispensing end located above the body portion as well as including a lower freestanding base that closes the lower extremity of the body portion. This lower freestanding base of the container has reduced crystallinity by virtue of the manner in which the liner is formed by vacuum applied to the one surface of the heated sheet of resin and the engagement of the other surface by the male vacuum mold.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
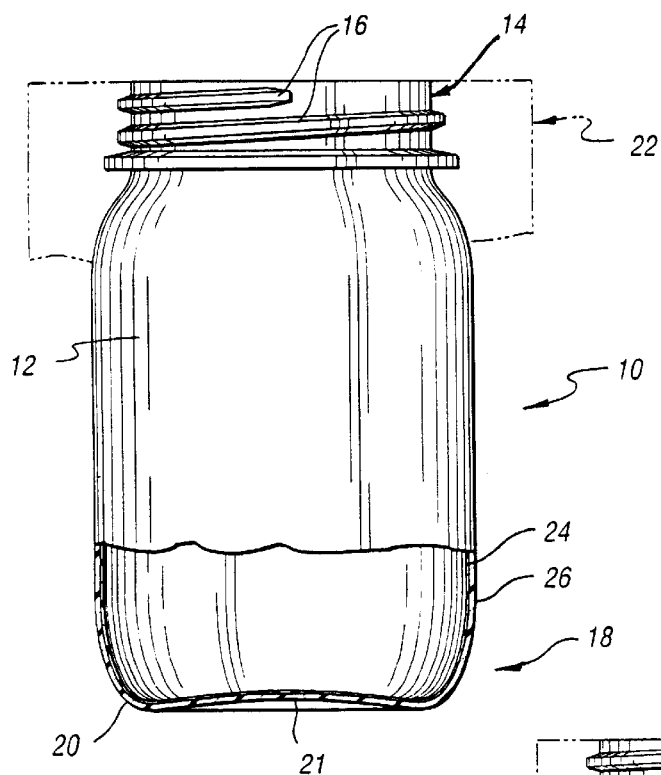
FIG. 1 is a partially broken away elevational view of a multi-layer blow molded container constructed in accordance with the invention and made by the method and apparatus thereof.

With reference to FIG. 1 of the drawings, a multi-layer blow molded container indicated by 10 is constructed in accordance with the present invention and is made by the method of the invention as is hereinafter more fully described. The container 10 includes a body portion 12 as well as an upper dispensing end 14 having an opening through which the contents are filled and ultimately dispensed. Retainers in the form of closure threads 16 are provided on the upper dispensing end 14 to hold an unshown closure cap. A lower freestanding base 18 of the container has a lower surface 20 at which the container is supported in a freestanding manner upon resting on a suitable surface. The center 21 of the freestanding surface has reduced crystallinity due to the manner in which the container is manufactured. Blow molding of the container 10 is performed within a schematically and partially indicated blow mold 22 from a multi-layer preform 10' illustrated in FIG. 2.

Figure 2:
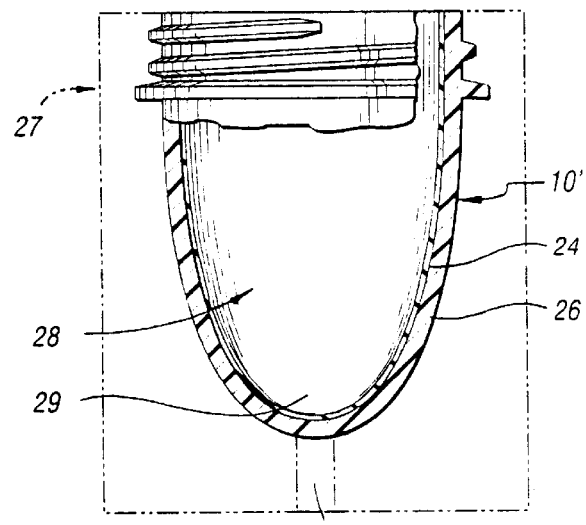
FIG. 2 is a partially broken away elevational view of a multi-layer preform that is constructed in accordance with the present invention and utilized to blow mold the container.

As shown in FIG. 2, the preform 10' includes an inner liner 24 that is thermoformed from a sheet of resin and also includes an injection molded outer layer 26 of resin extending around the inner liner to define the entire exterior of the container. The multi-layer preform 10' is made by inserting the thermoformed inner liner 24 into an injection mold 27 having a core pin 28 whose distal end 29 is located adjacent the area of the preform that eventually becomes the center 21 of the freestanding base 18 of the container shown in FIG. 1. The injection mold 27 has an injection port 30 through which the resin is injected to provide the outer layer 26 adjacent the core pin distal end 29. As a result of the process by which the inner liner 24 is thermoformed, the closed end of the liner adjacent this core pin distal end 29 has substantially the same thickness as the rest of the liner such that the liner does not provide increased insulation from the core pin and a consequent elevated temperature for a substantial period that can cause crystallinity in the liner and the resultant blow molded container. It will also be noted that the multi-layer preform 10' shown in FIG. 2 has a shorter height than the finally blown blow molded container 10 illustrated in FIG. 1 in that it is axially stretched during the blow molding process to provide biaxially orientation that strengthens the container.

Figure 3:
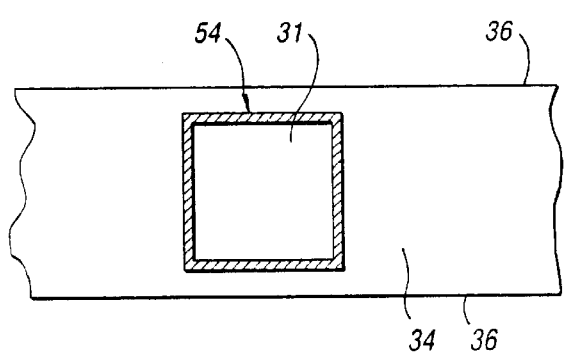
FIG. 3 is a top plan view taken partially in section to illustrate the manner in which a vacuum is drawn during thermoforming of a liner of the preform.
Figure 4:
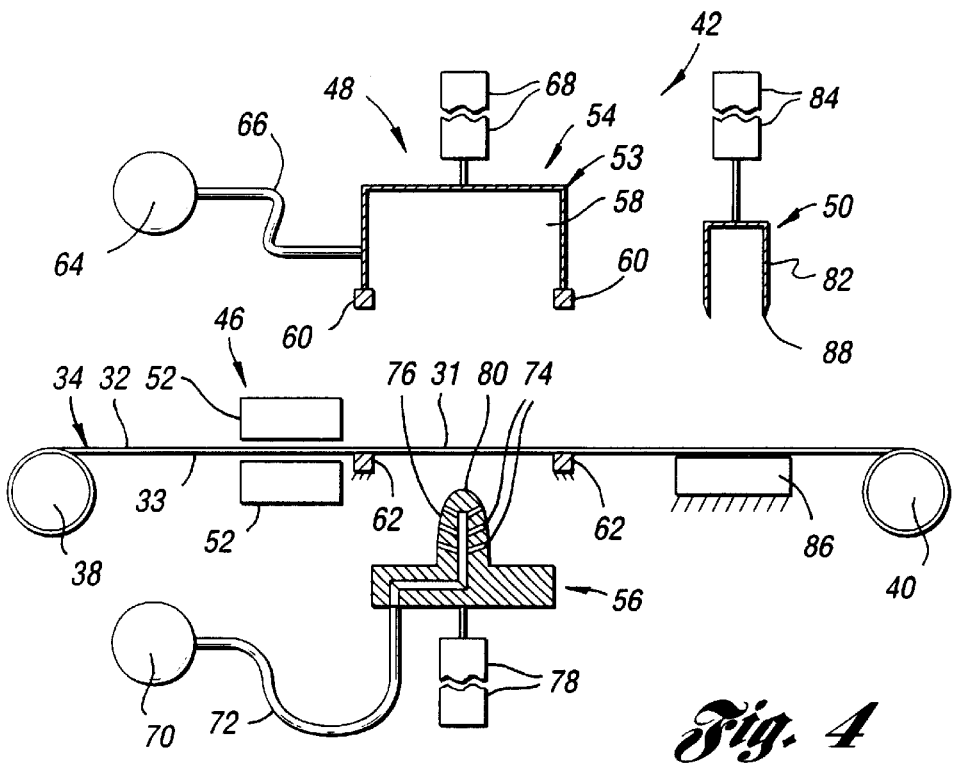
FIG. 4 is an elevational view illustrating apparatus of the invention for thermoforming the preform liner and is shown at an initial stage of a cycle of operation.
Figure 9:
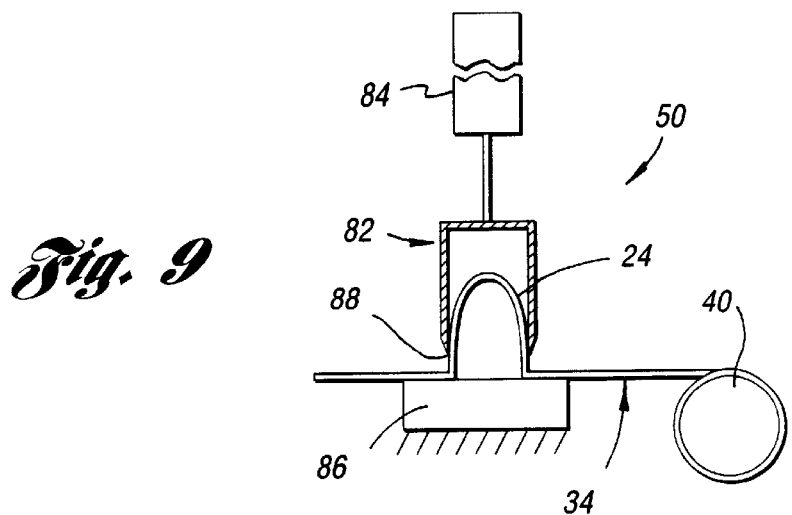
FIG. 9 is a partial view illustrating a trimming station where the preform liner is cut from the rest of a sheet of resin from which it is formed.

With reference to FIGS. 3 and 4, the inner liner is thermoformed from a confined area 31 to shape first and second oppositely facing surfaces 32 and 33 (FIG. 4) of a sheet 34 of resin between its edges 36 (FIG. 3). This resin sheet 34 as shown in FIG. 4 is provided from a supply roll 38 and moved toward the right therefrom to a scrap roll 40 through a preform liner manufacturing system 42. This preform liner manufacturing system 42 includes a heating station 46, a thermoforming station 48, and a trimming station 50 at which the completed liner is trimmed from the rest of the sheet 34 as illustrated in FIG. 9.

With continuing reference to FIG. 4, the heating station 46 includes a pair of opposed heaters 52 as illustrated between which the resin sheet 34 is moved for heating. These heaters 52 may be of any suitable type such as gas, electric resistance etc. to provide sufficient heating of the resin sheet 34 for softening in preparation for the thermoforming.

With continuing reference to FIG. 4, the thermoforming station 48 is located downstream from the heatingstation 46 and includes apparatus 53 for making the preform liner described above. This apparatus 53 includes a vacuum enclosure 54 located on one side of the resin sheet 34 adjacent its first surface 32 as well as including a male vacuum mold 56 located on the other side of the resin sheet adjacent its second surface 33. As is hereinafter more fully described, the vacuum enclosure 54 cooperates with the male vacuum mold 56 to provide the thermoforming of the preform liner previously described within the confined area 31 of the resin sheet 34.

Figure 4A:
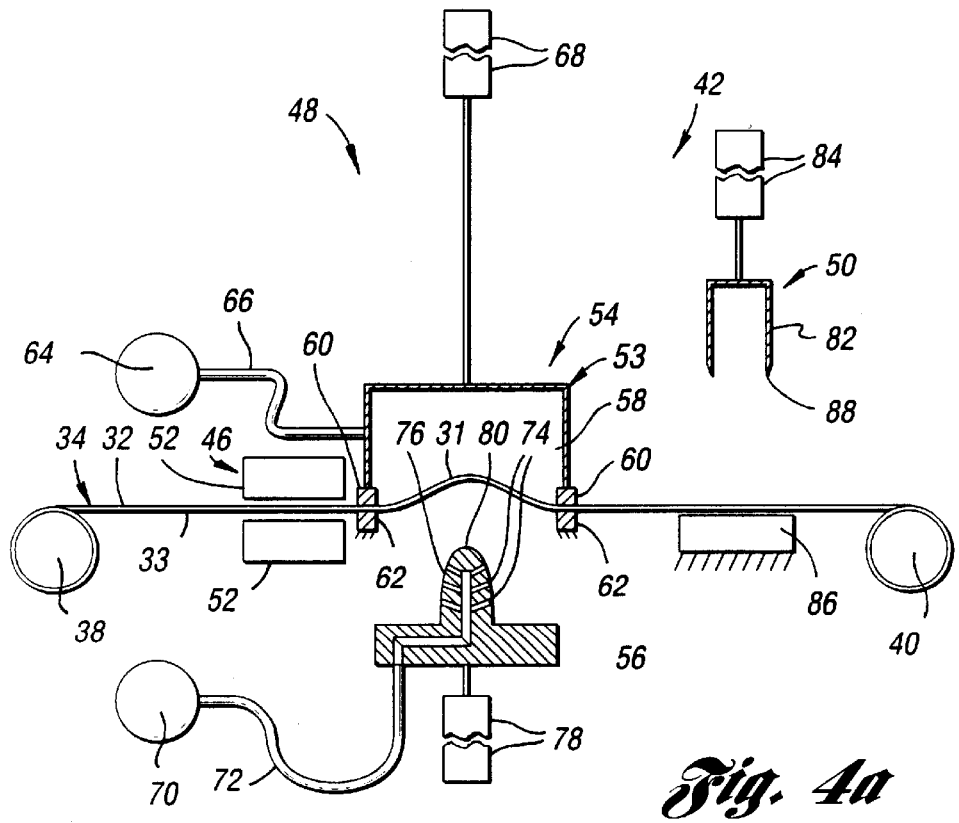
FIG. 4a is an elevation view similar to FIG. 4 at a later stage of the thermoforming cycle.

The vacuum enclosure 54 of the thermoforming apparatus 53 as shown in FIG. 4 is located above the resin sheet 34 and defines a vacuum chamber 58 as well as having a lower peripheral seal 60. The resin sheet 34 is movable over a stationary peripheral support 62 that conforms in shape to the lower seal 60 of the vacuum enclosure. A vacuum source 64 is communicated by a flexible conduit 66 with the vacuum chamber 58 to draw a vacuum within the vacuum chamber 58 during the thermoforming operation. An actuator 68 of any suitable type moves the vacuum enclosure 54 vertically toward and away from the stationary peripheral support 62 such that its lower seal 60 moves into and out of sealed engagement with the heated sheet of resin 34. A vacuum is drawn as shown in FIG. 4a within the vacuum chamber 58 such that within the confined area 31 the first surface 32 of the resin sheet 34 is formed to a convex shape and the second surface 33 is formed to a concave shape.

Figure 5:
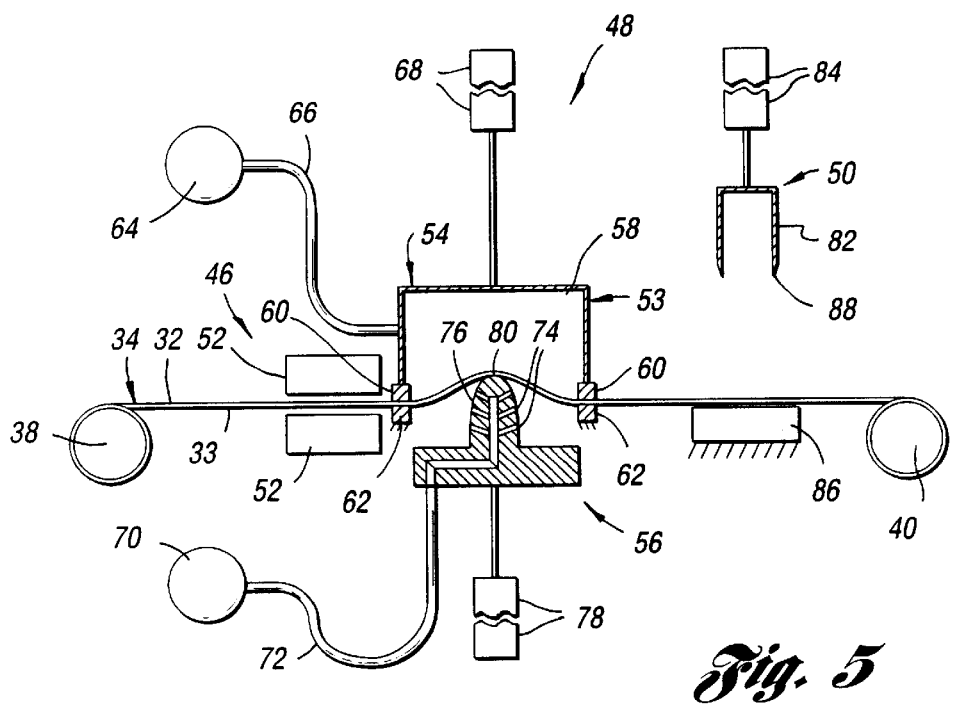
FIG. 5 is a view similar to FIG. 4a at a later stage of the thermoforming cycle.

As shown in FIG. 4, the male vacuum mold 56 of the thermoforming station 48 is located below the resin sheet 34 on the opposite side thereof from the vacuum enclosure 54 and includes a vacuum source 70 that is communicated by a suitable flexible conduit 72 to passages 74 of the male mold 56. These passages 74 extend to the male mold surface 76 which conforms to the inner surface of the formed liner 24 shown in FIG. 2. The male vacuum mold 56 with reference back to FIG. 4 includes an actuator 78 for providing movement thereof toward the resin sheet 34 as shown in FIG. 5. A distal end 80 of the mold surface 76 engages the concave second surface 33 of the resin sheet 34 as shown during the thermoforming operation. A vacuum is sequentially drawn through the male vacuum mold 56 as is hereinafter described in connection with FIGS. 6–8 to form the resin sheet 34 to the shape of the mold surface 76 and thereby form the liner for the blow molding preform as previously described. The curved shape of the resin sheet 34 within the confined area of the vacuum enclosure 54 as shown in FIG. 5 provides preforming before the forming provided by the male vacuum mold 56 and results in a thinner liner adjacent the distal end 80 of the mold surface 76. Having the thinner liner as previously mentioned prevents the liner from acting as an insulator at its closed end adjacent the injection port when the outer layer of the preform is injection molded. Thus, there is no heat insulating effect that can maintain heat from the injection molded outer layer in a manner that causes crystallinity to the outer layer as well as to the liner. This lack of crystallinity thus provides a stronger more effective blow molded container.

Figure 6:
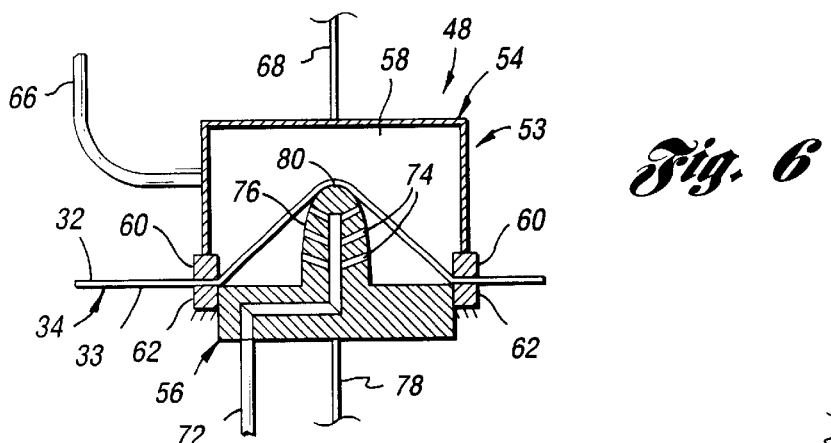
FIG. 6 is a partial view of a FIG. 5 at a still further stage of the thermoforming cycle.
Figure 7:
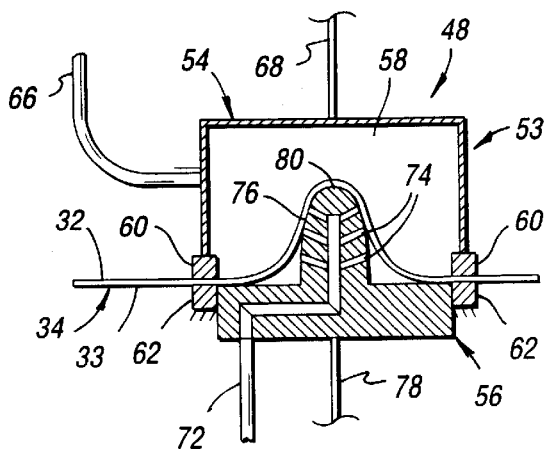
FIG. 7 is a partial view of the apparatus similar to FIG. 6 but at a yet still further stage of the thermoforming cycle.
Figure 8:
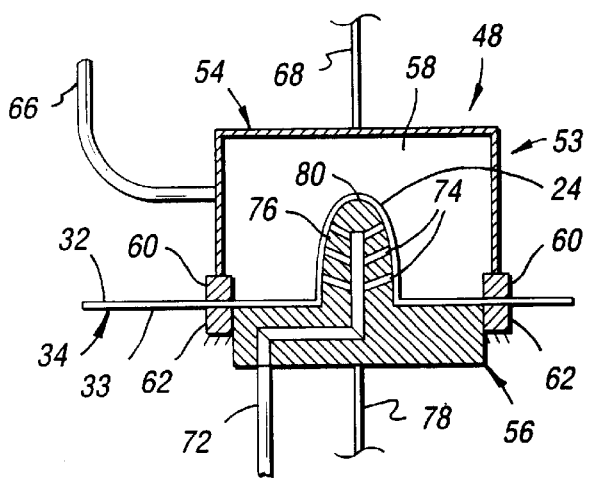
FIG. 8 is a view similar to FIG. 7 after completion of the thermoforming cycle to provide a preform liner for blow molding.

With reference to FIG. 6, the vacuum provided within the vacuum chamber 58 of the vacuum enclosure 54 is maintained at the first surface 32 of the heated sheet 34 of resin after the initial engagement of the male vacuum mold 56 with the second surface 33 thereof and while the male vacuum mold is thereafter moved to form the heated sheet of resin as shown in FIG. 6. The movement of the male vacuum mold under the operation of actuator 78 is then terminated and the vacuum drawn at the first surface 32 of the heated sheet 34 of resin is terminated within the vacuum chamber 58 of the vacuum enclosure 54. This termination of the vacuum within the vacuum chamber 58 causes the resin sheet 34 to further deform to the shape of the male vacuum mold 56 as shown in FIG. 7 even before the vacuum is drawn through the male vacuum mold. Drawing of the vacuum through the male vacuum mold 56 by the conduit 72 communicated with the mold passages 74 conforms the resin sheet to the mold surface 76 as shown in FIG. 8.

With reference to FIG. 9, the trimming station 50 includes a trimming member 82 moved by an actuator 84 toward and away from a lower support surface 86 over which the formed liner 24 is moved with the rest of the resin sheet 36 downstream from the thermoforming station described above. Downward movement of the trimming member 82 under the operation of actuator 84 engages a lower sharpened edge 88 thereof with the resin sheet 34 around the liner 24 to cut the liner from the rest of the resin sheet 34 which then is received by the scrap roll 40 as previously described.

After the trimming operation illustrated in FIG. 9, the liner 24 is transferred to the injection mold 27 as previously described for injection molding of the outer layer 26 to complete the manufacturing of the blow molding preform prior to blow molding thereof within the mold 22 illustrated in FIG. 1 to provide the multi-layer blow molded container 10.

The multi-layer blow molded container 10 shown in FIG. 1 advantageously can have an outer layer of resin 26 with sufficient resin such that the outer layer by weight constitutes at least 75% of the total weight of the container. More preferably, the outer layer by weight constitutes over 85% of the total weight of the container and, most preferably, constitutes about 88% to 92% of the total weight of the container with 90% being optimal. This great amount of the injection molded outer layer is possible because the liner is thermoformed and, according to the method involved, can have this thermoforming performed without crystallinity at the center 21 of the freestanding base 18 of the container as described above.

In one practice of the invention, the thermoforming of the liner 24 is performed with a sheet of virgin resin and the injection molding of the outer layer 26 is performed with post consumer recycled resin. It is also possible for the thermoforming to be performed on a sheet of resin that is a barrier material resistant to transmission of gases.

Figure 10:
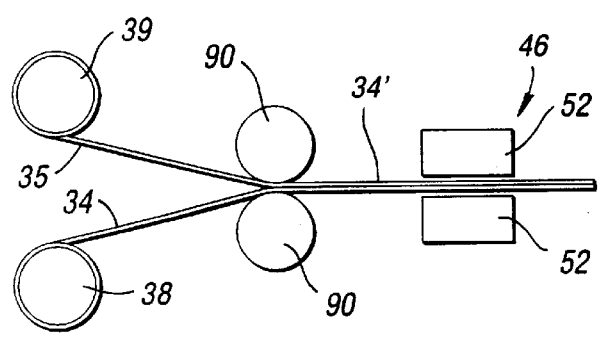
FIG. 10 illustrates an alternative practice of the invention wherein two sheets of resin are juxtaposed for the thermoforming to provide a multi-layer liner for the blow molding preform.

With reference to FIG. 10, while it is possible to make the multi-layer blow molded container by thermoforming the liner from a sheet of resin that includes a single layer, it is also possible to thermoform the liner from a sheet of resin 34' that includes more than one layer to provide a multi-layer liner around which the outer layer of resin is injection molded. More specifically, a pair of supply rolls 38 and 39 as illustrated upstream from the heating station 46 provide a pair of resin sheets 34 and 35 which are passed between a pair of rolls 90 into proximity with each other in order to provide the resin sheet 34' with more than one layer. Likewise, additional layers can also be provided. Such a multi-layer liner allows materials having desired properties to be combined with each other for the particular application for which the container is designed.

While the best modes for carrying out the invention have been described in detail, those familiar with the art to which this invention relates will recognize various alternative designs and embodiments for practicing the invention as defined by the following claims.

What is claimed is:

1. A method for making a multi-layer blow molded container, comprising:

moving a sheet of resin having oppositely facing first and second surfaces between a pair of spaced heaters to provide heating thereof;

drawing a vacuum at a confined area of the first surface of the heated sheet of resin such that the first surface has a convex shape and the second surface has a concave shape;

thereafter engaging a male vacuum mold with the second surface of the sheet of resin and drawing a vacuum through the male vacuum mold to thermoform the sheet of resin into a preform liner;

injection molding an outer layer of resin around the preform liner to provide a multi-layer preform; and blow molding the multi-layer preform to provide the multi-layer blow molded container.

2. A method for making a multi-layer blow molded container as in claim 1 wherein the vacuum is maintained at the first surface of the heated sheet of resin after the male vacuum mold engages the second surface thereof and while the male vacuum mold is thereafter moved to form the heated sheet of resin.

3. A method for making a multi-layer blow molded container as in claim 2 wherein movement of the male vacuum mold is terminated and the vacuum drawn at the first surface of the heated sheet of resin is terminated, and a vacuum is then drawn through the male vacuum mold to complete the forming of the preform liner.

4. A method for making a multi-layer blow molded container as in claim 1 wherein the preform liner is trimmed-from the sheet of resin prior to the injection molding of the outer layer of resin.

5. A method for making a multi-layer blow molded container as in claim 1 wherein the injection molding of the outer layer of resin is performed with sufficient resin such that the outer layer by weight constitutes at least 75% of the weight of the container.

6. A method for making a multi-layer blow molded container as in claim 1 wherein the thermoforming is performed using virgin resin and the injection molding is performed with post consumer recycled resin.

7. A method for making a multi-layer blow molded container as in claim 1 wherein the thermoforming is performed using a barrier material.

8. A method for making a multi-layer blow molded container as in claim 1 wherein the sheet of resin that is thermoformed includes more than one layer to provide a multi-layer liner around which the outer layer of resin is injection molded.

* * * * *

UNITED STATES PATENT AND TRADEMARK OFFICE
CERTIFICATE OF CORRECTION

PATENT NO. : 6,296,803 B1  
DATED : October 2, 2001  
INVENTOR(S) : Richard C. Darr Page 1 of 1

It is certified that error appears in the above-identified patent and that said Letters Patent is hereby corrected as shown below:

Column 7,
Lines 5 and 6, after "is" replace "trimmed-from" with -- trimmed from --.

Signed and Sealed this

Second Day of April, 2002

Attest:

JAMES E. ROGAN
Attesting Officer
Director of the United States Patent and Trademark Office